United States Patent [19]

Fritzlen

[11] 4,320,398
[45] Mar. 16, 1982

[54] MINIMIZING HARMONIC DISTORTION APPARATUS

[76] Inventor: Jack D. Fritzlen, P.O. Drawer D, Minturn, Colo. 81645

[21] Appl. No.: 159,044

[22] Filed: Jun. 13, 1980

[51] Int. Cl.³ .............................................. G01S 13/58
[52] U.S. Cl. ......................................... 343/8; 343/7 A
[58] Field of Search ...................................... 343/7 A, 8

[56] References Cited

U.S. PATENT DOCUMENTS

| | | | |
|---|---|---|---|
| 3,618,084 | 11/1971 | Balsiger et al. | 343/8 X |
| 4,020,490 | 4/1977 | Millard | 343/8 |
| 4,052,722 | 10/1977 | Millard | 343/8 |
| 4,117,483 | 9/1978 | Fujiki | 343/8 |
| 4,172,256 | 10/1979 | Pacozzi | 343/8 |

Primary Examiner—T. H. Tubbesing
Attorney, Agent, or Firm—Sheridan, Ross & McIntosh

[57] ABSTRACT

An apparatus is provided to minimize harmonic distortion in a microwave circuit which is used with a velocity measuring system. The apparatus is particularly applicable where at least two Doppler signals are generated at substantially the same time from two different targets whose velocity is being measured. The apparatus includes a microwave circuit which transmits a microwave energy signal directed to each of the targets. The microwave circuit also receives the signals reflected by the targets and produces Doppler signals. A control circuit responds to the Doppler signals outputted by the microwave circuit by providing a control signal corresponding to the greatest in amplitude of the Doppler signals. The control signal is fed back to the microwave circuit to control the Doppler signals so that a predetermined amplitude thereof is not exceeded and, as a consequence, harmonics of the Doppler signals are not generated.

7 Claims, 1 Drawing Figure

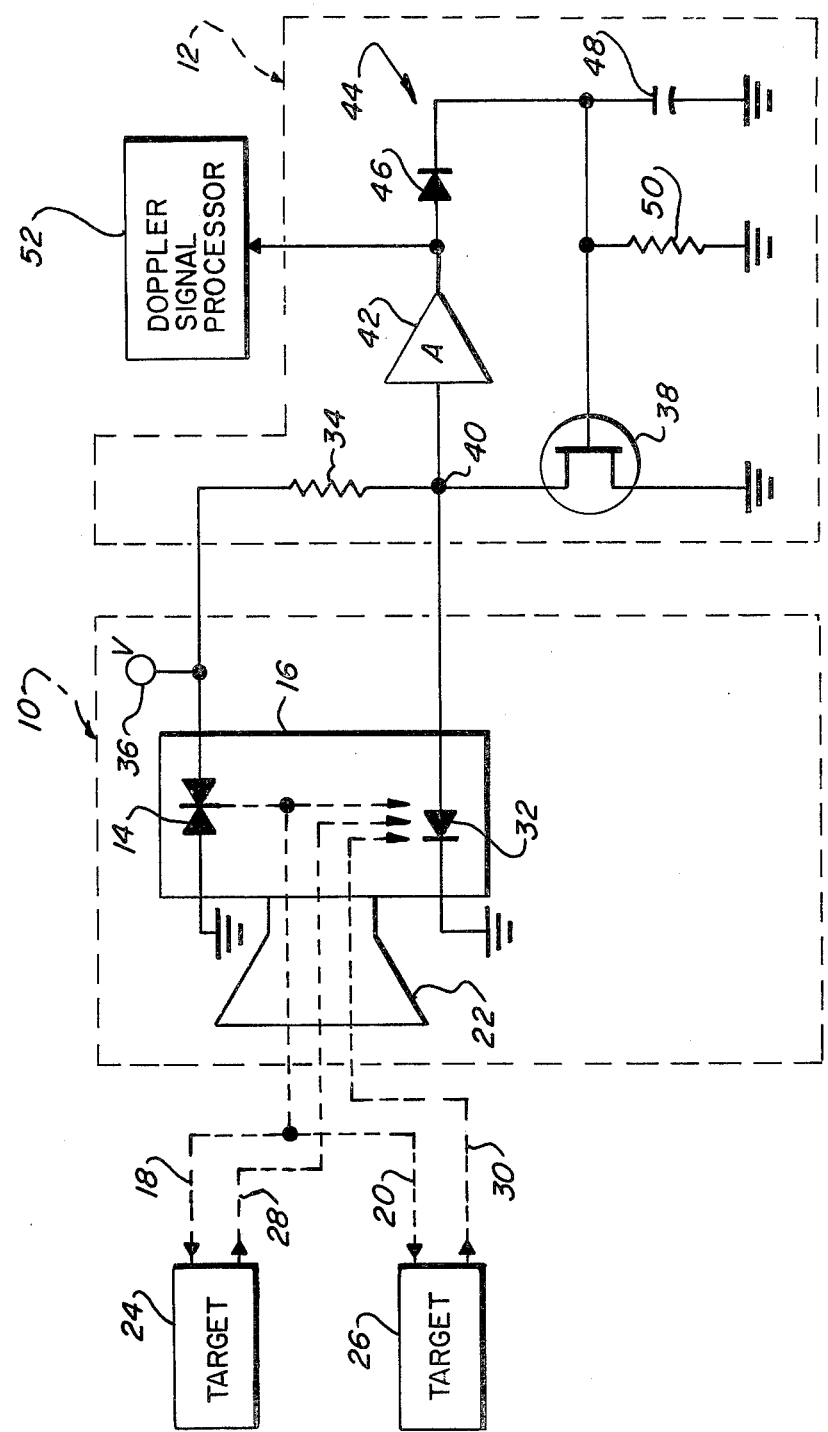

MINIMIZING HARMONIC DISTORTION APPARATUS

FIELD OF INVENTION

The present invention relates to an apparatus for minimizing harmonic distortion and, in particular, to an apparatus which minimizes harmonic distortion when at least two Doppler frequencies are generated in a microwave circuit at substantially the same time.

BACKGROUND ART

U.S. Pat. No. Re. 29,401 to Aker et al. discloses a speed measurement or radar system for determining the speed of a vehicle while the platform for supporting the radar is also moving. In this regard, two different Doppler signals are generated. A first Doppler signal is indicative of the speed of the radar platform. A second Doppler signal is indicative of the relative speed between the approaching vehicle and the radar platform. The radar includes an automatic gain control (AGC) circuit which receives each Doppler signal after it has been amplified. The Doppler signals are then processed to provide a digital read out representative of the speed of the approaching vehicle. U.S. Pat. No. 3,721,977 to Darboven describes an aircraft velocity sensing system which uses four switchable beams and provides an indication that a lock-on of an image beam has occurred. The system includes a detector of outputting a Doppler frequency spectrum related to the velocity component of the aircraft. The Doppler signals of each of the beams are passed through a band pass filter and then through an AGC to control the level or amplitude of the Doppler signals in each returned beam. The level of Doppler signals outputted by the AGC is controlled by frequency tracking loop. The frequency tracking loop includes a discriminator having a cosine mixer and low pass filters. The cosine mixer signal is fed back to the AGC so that the AGC is controlled by the level of the center frequency tracked by the frequency trackin loop. The frequency tracking loop also includes a voltage controlled local oscillator which is maintained at a frequency proportional to the center frequency in the Doppler spectrum. This frequency output signal is applied to a velocity computer for determining velocity of the aircraft. British Pat. No. 1,468,159 to Whetton et al. describes a speed measuring system for use with vehicles wherein a broad spectrum of Doppler frequencies is first applied to a high pass filter. The cut-off frequency of the high pass filter is adjustable by a signal fed back to the filter. The cut-off frequency corresponds to the frequency of the signal having the maximum amplitude which is detected in the Doppler spectrum inputted to the high pass filter.

The present invention is directed to an apparatus for minimizing harmonic distortion in a microwave circuit which outputs a number of Doppler signals at substantially the same time. The multiple Dopper signals are generated as a result of measuring simultaneously, or very close in time, the velocity of two or more objects. If at least one Doppler frequency is harmonically distorted at the output of the microwave circuit, subsequent processing of the Doppler signals to provide a velocity measurement may be falsified or impeded by the presence of unwanted harmonics of the fundamental Doppler frequencies.

SUMMARY OF THE INVENTION

The apparatus of the present invention includes a microwave circuit comprising a source of microwave energy, a transmitter/receiver for directing the energy and receiving the energy reflected from the targets whose velocity is being measured, and a detector/mixer for producing Doppler signals indicative of the velocity of the targets being measured. This apparatus further includes a control circuit responsive to the microwave circuit for adjusting the amplitude of each Doppler signal to minimize the generation of Doppler signal harmonics.

More particularly, the Present invention is directed to an apparatus for minimizing harmonic distortion occurring as a result of the simultaneous or very close in time measurement of the velocity of at least two moving objects or targets. The apparatus includes a microwave circuit and a control circuit. The microwave circuit includes a Gunn diode which produces a microwave energy signal and an antenna for transmitting the microwave energy signal towards the targets whose velocity is to be measured. The antenna also receives the energy signal reflected from each of the targets. The microwave circuit further includes a microwave mixer diode which mixes a portion of the source microwave energy signal with the reflected energy signal to produce Doppler signals. The frequency of the Doppler signal is indicative of the frequency difference between the reflected energy signal from one of the targets and the transmitted energy signal. The control circuit is responsive to the microwave circuit and is provided to minimize harmonic distortion in the Doppler signals by controlling the amplitude of each of the Doppler signals. The amplitude of the Doppler signals can be controlled by amplifying or attenuating the transmitted energy signal, by amplifying or attenuating the reflected energy signal, or by controlling the microwave mixer diode so that the amplitude of the produced Doppler signal is below a predetermined magnitude. The amplitude adjustment of one or more of these signals or adjustment of the gain of the mixer diode controls the amplitude of the produced Doppler signals so that the output of the microwave circuit does not include harmonics of the fundamental Doppler frequency. The control circuit generates a control signal based upon the Doppler signal having the maximum or greatest amplitude. The control signal is fed back to the microwave circuit to adjust one or more of the signals present in the microwave circuit which are pertinent to the generation of the Doppler signal so that the Doppler signal does not exceed a predetermined amplitude.

Based on the foregoing, a number of advantages of the present invention are readily discernable. An apparatus is provided which minimizes harmonic distortion in a microwave circuit when multiple Doppler signals indicative of the velocity of a number of moving objects are generated very close in time. The amplitude of the Doppler signals can be controlled at a number of different points in the microwave circuit, including adjusting the amplitude of the microwave energy source or transmitted signal, by adjusting the reflected signals, or adjusting the gain of the microwave mixer diode. As a consequence of this adjusting or controlling capability, the output of the microwave mixer diode does not include harmonics of the fundamental Doppler frequency. Subsequent processing then of each of the Doppler signals is not affected by the presence of unwanted harmonics. Additional advantages of this invention will become readily apparent when taken in conjunction with the accompanying drawing.

BRIEF DESCRIPTION OF THE DRAWING

The single FIGURE is an electrical schematic of the present invention showing one embodiment for controlling the amplitude of the Doppler signals.

DESCRIPTION OF THE PREFERRED EMBODIMENT

In accordance with this invention, a microwave circuit 10 and a control circuit 12 are provided to generate Doppler signals and control the amplitude of the Doppler signals, respectively. This invention is particularly useful in velocity measuring or radar devices in which the velocity of two or more different targets are being measured and the reflected signals from the targets are received by the radar device at the same time or very near in time. If more than one Doppler signal is generated representative of the difference between the frequency of the transmitted signal and the frequency of the reflected signal and when one of the Doppler signals is harmonically distorted, the radar device may be unable to distinguish between a first Doppler signal and a harmonic of a second Doppler signal. As a consequence, an inaccurate determination of the velocity of one of the targets may result. In those instances in which a single Doppler signal is generated, even if harmonics thereof are also produced, the radar device is able to distinguish between the Doppler signal and its harmonics since the amplitude of and the energy present in the fundamental Doppler signal is distinguishably greater than its harmonics.

The microwave circuit 10 includes a source of microwave energy 14. Typically, the microwave energy source is a Gunn diode oscillator which generates a sinusoidal signal of energy at a predetermined frequency. This sinusoidal microwave signal is directed by a conventional wave guide 16 along two separate paths 18 and 20. Along path 18 the microwave signal is received by target 24. Along path 20 the microwave signal is received by target 26. Targets 24, 26 represent moving objects or vehicles, the speed of which is to be determined. Target 24 reflects a portion of the microwave signal back along path 28 while target 26 reflects a portion of the microwave signal back along path 30. As is well known to those skilled in the art, the frequency of each of the reflected signals will be shifted relative to the transmitted signal by the movement of targets 24, 26.

The reflected signals and a portion of the transmitted signal are detected and mixed in a microwave mixer signal diode 32. In this embodiment, the mixer diode 32 is identified by the commercial part number 1N23C. The mixer diode 32 detects the transmitted and reflected signals inputted thereto and outputs a Doppler signal for each target. Each Doppler signal has a frequency corresponding to the difference between the frequency of the transmitted signal and the frequency of one of the reflected signals. The mixer diode 32 also amplifies the Doppler signal generated. The signal gain provided by the mixer diode 32 is directly related to the magnitude of the current passing through the mixer diode 32. The greater the magnitude of the current through the mixer diode 32, the greater the amplification of the Doppler signal.

If the gain of the mixer diode 32 is relatively high, a relatively large amplitude signal inputted thereto could cause the mixer diode 32 to exceed its dynamic amplifying range. A large amplitude signal could occur in those instances in which one of the targets 24, 26 is relatively near the radar device. As a result, the output of the mixer diode 32 would be harmonically distorted since the output would include harmonics of the Doppler or fundamental signal frequency. In order to alleviate the harmonic distortion problem, the gain of the mixer diode 32 could be preset to a predetermined value. The preset gain could be selected such that the greatest anticipated input would not be distorted. However, fixing such a gain would result in the reduction of the signal detection capability of the mixer diode 32 and the mixing of very weak or low amplitude signals which are reflected by the targets 24, 26.

The control circuit 12 in conjunction with the microwave circuit 10 minimizes the possibility of harmonic distortion while permitting sufficient signal strength for subsequent processing to determine the velocity of the targets 24, 26. The control circuit 12 includes a bias resistor 34 connected to a source of DC energy 36(V). The bias resistor 34 is also joined to a variable shunt 38, typically, a field effect transistor (FET). The mixer diode 32 is also connected to bias resistor 34 and FET 38 at circuit point 40. A conventional amplifier 42 also communicates with the output of mixer diode 32 at circuit point 40. The output signal of amplifier 42 is applied to a rectifying circuit 44, comprising diode 46, capacitor 48, and resistor 50 to produce a control signal. The control signal is a DC signal proportional to the amplitude of the Doppler signal having the maximum amplitude outputted by amplifier 42. The control signal is applied to the gate of FET 38. The impedance between the drain and source of FET 38 is directly related to the magnitude of the control signal. The greater the magnitude of the control signal, the less drain to source impedence is present.

In those instances in which the Doppler signal has a relatively great or strong amplitude, the rectifying circuit 44 outputs a relatively large or high voltage control signal which decreases the drain to source impedence of FET 38. As a consequence, more of the current through bias resistor 34 is shunted to ground through FET 38, rather than through mixer diode 32. There is then less current through mixer diode 32 and the gain thereof is reduced, as previously explained, to adjust the strong Doppler signal being produced in mixer diode 32. If the Doppler signal has a relatively low or weak amplitude, the corresponding control signal is less in magnitude thereby increasing the drain to source impedence of FET 38. There is relatively greater current through mixer diode 32 thereby increasing the gain thereof. Harmonic distortion of the Doppler signal is thereby minimized since the gain of the mixer diode 32 is adjustable to compensate for strong signals inputted thereto. In addition, weak signals are more greatly amplified to facilitate subsequent processing thereof.

Amplifier 42 is provided in the control circuit so that the Doppler signals inputted thereto are amplified to appropriate signal levels for further processing by Doppler signal processor 52 to determine the velocity of each of the targets 24, 26. Doppler signal processor 52 comprises well-known means and the discussion thereof is not pertinent to the present invention. The gain of amplifier 42 is selected so that the output thereof is also not harmonically distorted. The amplitude of the Doppler signal which would produce harmonic distortion in mixer diode 32 can be determined given the magnitude of the current in the mixer diode 32. Based on this predetermined value, the magnitude of the control signal can be found which would reduce the drain to source impedance of FET 38 such that sufficient current is shunted through FET 38 so that the gain of mixer diode 32 is decreased. Since the input and the output of the amplifier 42 can be determined, the desired gain of the amplifier 42 can be selected such that the control signal outputted therefrom results in a mixer diode 32 gain less than the gain which would otherwise produce harmonic distortion. It is readily appreciated that the gain of mixer diode 32 can be substantially reduced so that the gain appraoches a zero value by shunting essentially all of the current in bias resistor 34 through FET 38. In addition, as the drain to source impedance of FET 38 decreases, FET 38 also acts to increase the attenuation of the Doppler signal inputted to amplifier 42 from mixer diode 32.

Although the above description is directed to the controlling of the gain of mixer diode 32 in order to minimize harmonic distortion, it is understood that the control signal could be provided to adjust the amplitude of one or more of the signals present in the microwave circuit. The amplitude of the transmitted signal produced by the Gunn diode oscillator 14 could also be adjusted through the use of a conventional attenuating device connected to the Gunn diode oscillator 14 and by the feeding back of the control signal corresponding to the greatest in amplitude Doppler signal to the attenuating device. The amplitude of the transmitted signal could also be adjusted through the use of conventional means connected to the antenna 22 and the feeding back thereto of the control signal. The amplitude of each of the reflected signals could also be controlled through the use of conventional means connected to the antenna 22, for example, and the feeding back of the control signal thereto. Regardless of where in the microwave circuit a signal is controlled which is used in the determination of the Doppler frequency, the end result is the controlling of the amplitude of the Doppler frequency and the minimizing of harmonic distortion.

Althrough the present invention has been described for use primarily with two or more Doppler signals being generated at substantially the same time, it is understood that this invention has application when a single Doppler signal is produced since the control signal can be used to adjust the amplitude of this one Doppler signal.

In view of the foregoing description, a number of advantages of the present invention are readily seen. An apparatus is provided for minimizing harmonic distortion in Doppler signals which are generated in a velocity measuring or radar system. The present invention is particularly useful when the velocity of two or more targets is measured at substantially the same time so that two or more Doppler signals are produced simultaneously or very close in time. The apparatus generates a control signal corresponding to the strongest or greatest in amplitude Doppler frequency. The control signal is fed back to the microwave circuit to control or adjust one or more signals pertinent to the determination of the Doppler signal. As a consequence, a radar system incorporating this invention is able to satisfactorily minimize the generation of unwanted harmonics from fundamental Doppler frequencies outputted by the microwave circuit. In one embodiment, the gain of the mixer diode is adjusted based on the magnitude of the control signal.

This invention has been described in detail with reference to a plurality of embodiments thereof, but it will be understood that various other modifications can be effected within the spirit and scope of this invention.

I claim:

1. An apparatus for minimizing harmonic distortion in the output of a microwave circuit, comprising:
   microwave circuit means for minimizing harmonic distortion when at least two Doppler signals are outputted therefrom at substantially the same time, said microwave circuit means including first means for transmitting a first signal and second means for receiving second signals reflected by objects in the path of the first signal and for producing Doppler signals using each of the second signals and said first signal; and
   means responsive to said second means for generating a control signal corresponding to the maximum in amplitude Doppler signal, said microwave circuit means being responsive to the control signal so that the amplitude of each of the Doppler signals is adjustable such that harmonic distortion of the Doppler signals is minimized.

2. The apparatus, as claimed in claim 1, wherein:
   said second means includes a mixer diode and the gain of said mixer diode is adjustable for minimizing harmonic distortion of the Doppler signals.

3. The apparatus, as claimed in claim 2, wherein:
   said means for generating a control signal includes means for shunting the current from said mixer diode.

4. The apparatus, as claimed in claim 1, wherein:
   said means for generating a control signal includes rectifying means for producing a voltage indicative of the maximum amplitude of the Doppler signals.

5. An apparatus for minimizing harmonic distortion in the output of a microwave circuit, comprising:
   microwave circuit means for minimizing harmonic distortion, said microwave circuit means including first means for transmitting a first signal and second means for receiving a second signal reflected by an object in the path of the first signal and for producing a Doppler signal using said first signal and said second signal; and
   means responsive to said second means for generating a control signal from the amplitude of the Doppler signal, said microwave circuit means being responsive to the control signal to adjust the amplitude of the Doppler signal so that harmonic distortion of the Doppler signal is minimized.

6. An apparatus for minimizing harmonic distortion in the output of a microwave circuit, comprising:
   microwave circuit means for minimizing harmonic distortion when at least two Doppler signals are outputted therefrom at substantially the same time, said microwave circuit means including first means for transmitting a first signal and second means for receiving the first signal and second signals reflected by objects in the path of the first signal and for producing Doppler signals using each of the second signals and said first signal; and
   means responsive to said second means for generating a control signal corresponding to the maximum in amplitude Doppler signal, said first means being in communication with the control signal for adjusting the amplitude of the first signal.

7. An apparatus for minimizing harmonic distortion in the output of a microwave circuit, comprising:
microwave circuit means for minimizing harmonic distortion when at least two Doppler signals are outputted therefrom at substantially the same time, said microwave circuit means including first means for transmitting a first signal and second means for receiving the first signal and second signals reflected by objects in the path of the first signal and for producing Doppler signals using each of the second signals and said first signal; and
means responsive to said second means for generating a control signal corresponding to the maximum in amplitude Doppler signal, said second means being in communication with the control signal for adjusting the amplitude of the second signal.

* * * * *